(12) United States Patent
Li (10) Patent No.: US 8,332,413 B1
(45) Date of Patent: Dec. 11, 2012

(54) METHOD AND DEVICE FOR PRESENTING RELATIONSHIP CLOSENESS

(75) Inventor: Rui Li, Nanjing (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/470,937

(22) Filed: May 14, 2012

Related U.S. Application Data (63) Continuation of application No. PCT/CN2011/081311, filed on Oct. 26, 2011.

(51) Int. Cl.
*G06F 17/30* (2006.01)
*G06F 7/00* (2006.01)

(52) U.S. Cl. .......................... 707/748; 707/803; 707/769

(58) Field of Classification Search .................. 707/748, 707/803, 769
See application file for complete search history.

(56) References Cited

U.S. PATENT DOCUMENTS

| | | | |
|---|---|---|---|
| 2008/0228746 A1* | 9/2008 | Markus et al. ..................... | 707/5 |
| 2009/0319289 A1* | 12/2009 | Pande ............................... | 705/1 |
| 2012/0158751 A1* | 6/2012 | Tseng .............................. | 707/751 |

FOREIGN PATENT DOCUMENTS

| | | |
|---|---|---|
| CN | 101094262 A | 12/2007 |
| CN | 01365008 A | 2/2009 |
| CN | 101599917 A | 12/2009 |
| CN | 102158581 A | 8/2011 |
| CN | 102439955 A | 5/2012 |

OTHER PUBLICATIONS

International Search Report and Written Opinion of The International Searching Authority related to Application No. PCT/CN2011/081311; dated (mailed) Aug. 2, 2012 (22 pgs.).

\* cited by examiner

*Primary Examiner* — Kuen Lu
(74) *Attorney, Agent, or Firm* — Finnegan, Henderson, Farabow, Garrett & Dunner, LLP (57) ABSTRACT

A method for presenting relationship closeness, relating to the field of communications, includes: acquiring an identifier of a contact object selected by a user; acquiring, according to the identifier of the contact object, at least one contact factor of contact between the user and the contact object in a period; calculating a value of closeness between the user and the contact object according to the contact factor, where the value of closeness is used to indicate closeness between the user and the contact object; and displaying the value of closeness as a graphical object. The device includes: a first acquiring module, a second acquiring module, a calculation module and a display module. Through the present invention, the relationship closeness can be presented objectively.

22 Claims, 3 Drawing Sheets

Generate, according to a preset range of a value of closeness, a first virtual display element displayed on a screen, where the first virtual display element is used to indicate the preset range of the value of closeness through a span of the first virtual display element on the screen, and the value of closeness is used to indicate a frequency between a user and a contact object ⎯ 301

Generate, according to an acquired current value of closeness, a second virtual display element displayed on the screen, where the second virtual display element is attached to the first virtual display element for indicating the value of closeness through a position of the second virtual display element relative to the first virtual display element ⎯ 302

METHOD AND DEVICE FOR PRESENTING RELATIONSHIP CLOSENESS

CROSS-REFERENCE TO RELATED APPLICATIONS

This application is a continuation of International Application No. PCT/CN2011/081311, filed on Oct. 26, 2011, which is hereby incorporated by reference in its entirety.

FIELD OF THE INVENTION

The present invention relates to the field of communications, and in particular, to a method and device for presenting relationship closeness.

BACKGROUND OF THE INVENTION

A user may contact other contact objects through a communication tool such as a mobile phone. The mobile phone has a contact object list, and the user may store a contact object to be contacted in the contact object list.

The user may also set favorites in the mobile phone. The user may selected some special contact objects in the contact object list as the favorites. Relationship closeness between the user and close contact objects is higher than relationship closeness between the user and other contact objects. Therefore, the user's behavior of adding the close contact objects into the favorites is a special manner presenting the relationship closeness.

The user actively adds the contact objects to the favorites, and the relationship closeness between the user and the contact objects is decided by a subjective factor of the user. Therefore, the relationship closeness between the user and the contact objects cannot be presented objectively at present.

SUMMARY OF THE INVENTION

In order to present relationship closeness objectively, embodiments of the present invention provide a method and device for presenting relationship closeness. The technical solutions are as follows.

A method for acquiring relationship closeness, where the method includes:

acquiring an identifier of a contact object selected by a user;

acquiring, according to the identifier of the contact object, at least one contact factor of contact between the user and the contact object in a period, where the contact factor includes contact duration or the number of times of contact;

calculating a value of closeness between the user and the contact object according to the contact factor, where the value of closeness is used to indicate closeness between the user and the contact object; and displaying the value of closeness as a graphical object.

A method for presenting relationship closeness, where the method includes:

generating, according to a preset range of a value of closeness, a first virtual display element displayed on a screen, where the first virtual display element is used to indicate the preset range of the value of closeness through a span of the first virtual display element on the screen, and the value of closeness is used to indicate a frequency between a user and a contact object; and generating, according to an acquired current value of closeness, a second virtual display element displayed on the screen, where the second virtual display element is attached to the first virtual display element for indicating the value of closeness through a position of the second virtual display element relative to the first virtual display element.

A device for acquiring relationship closeness, where the device includes:

a first acquiring module, configured to acquire an identifier of a contact object selected by a user;

a second acquiring module, configured to acquire, according to the identifier of the contact object, at least one contact factor of contact between the user and the contact object in a period, where the contact factor includes contact duration or the number of times of contact;

a calculation module, configured to calculate a value of closeness between the user and the contact object according to the contact factor and through a preset calculation model, where the value of closeness is used to indicate closeness between the user and the contact object; and a display module, configured to display the value of closeness as a graphical object.

A device for presenting relationship closeness, where the device includes:

a first generation module, configured to generate, according to a preset range of a value of closeness, a first virtual display element displayed on a screen, where the first virtual display element is used to indicate the preset range of the value of closeness through a span of the first virtual display element on the screen, and the value of closeness is used to indicate a frequency between a user and a contact object; and a second generation module, configured to generate, according to an acquired current value of closeness, a second virtual display element displayed on the screen, where the second virtual display element is attached to the first virtual display element for indicating the value of closeness through a position of the second virtual display element relative to the first virtual display element.

In the present invention, the identifier of the contact object selected by the user is acquired. The contact factor of contact between the user and the contact object in a period is acquired according to the identifier of the contact object selected by the user. A value of closeness between the user and the contact object is calculated according to the acquired contact factor, and the calculated value of closeness is displayed as the graphical object. In this way, the relationship closeness between the user and the contact object can be presented objectively.

DETAILED DESCRIPTION OF THE EMBODIMENTS

To make the objectives, the technical solutions, and advantages of the present invention clearer, embodiments of the present invention will be described in further detail in the following with reference to accompanying drawings.

Embodiment 1

Figure 1:
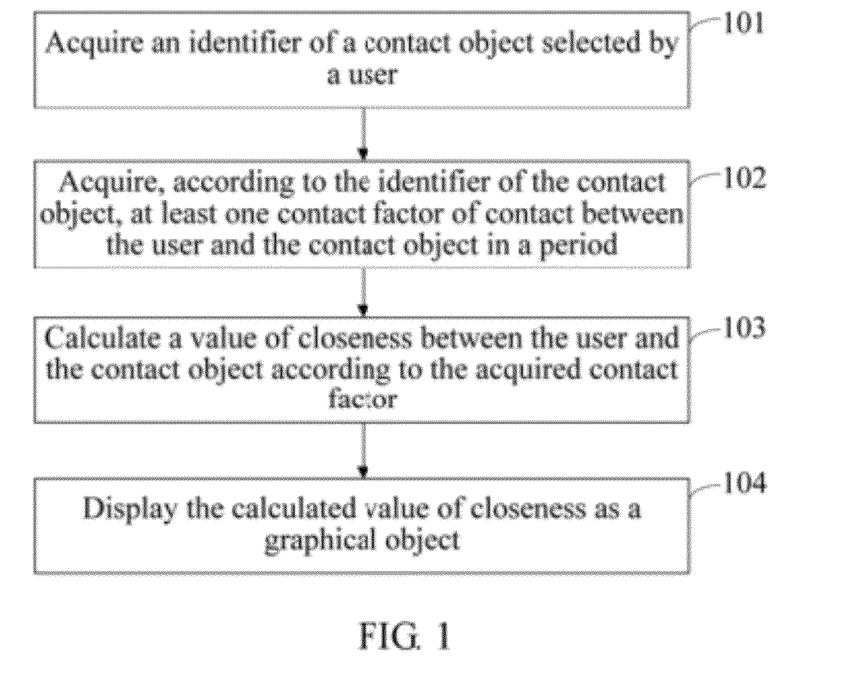
FIG. 1 is a flow chart of a method for presenting relationship closeness according to Embodiment 1 of the present invention.

As shown in FIG. 1, an embodiment of the present invention provides a method for acquiring relationship closeness, which includes:

Step 101: Acquire an identifier of a contact object selected by a user.

Step 102: Acquire, according to the identifier of the contact object, at least one contact factor of contact between the user and the contact object in a period, where the contact factor includes contact duration or the number of times of contact.

Step 103: Calculate a value of closeness between the user and the contact object according to the acquired contact factor.

The value of closeness is used to indicate a contact frequency between the user and the contact object, and may be used to measure closeness between the user and the contact object. The contact object may be a contact person or a contact group.

Step 104: Display the calculated value of closeness as a graphical object.

In the embodiment of the present invention, the identifier of the contact object selected by the user is acquired. At least one contact factor of contact between the user and the contact object in a period is acquired according to the identifier of the contact object selected by the user. The value of closeness between the user and the contact object is calculated according to the acquired contact factor, and the calculated value of closeness is displayed as the graphical object. In this way, the relationship closeness between the user and the contact object is presented objectively.

Embodiment 2

Figure 2:
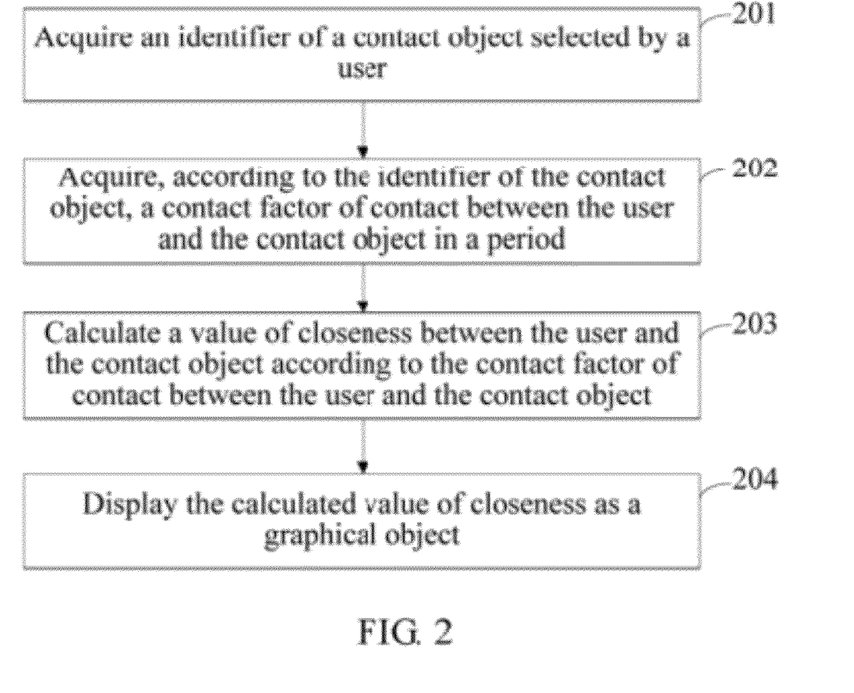
FIG. 2 is a flow chart of a method for presenting relationship closeness according to Embodiment 2 of the present invention.

As shown in FIG. 2, an embodiment of the present invention provides a method for presenting relationship closeness, which includes:

Step 201: Acquire an identifier of a contact object selected by a user.

A contact object list exists in a communication device. The contact object list is used to store a contact object to be contacted by the user. The user may open the contact object list by the communication device, select a contact object in the contact object list, and request the communication device to present relationship closeness between the user and the selected contact object. The communication device may be a mobile phone. The identifier of the contact object may be a mobile phone number or a name of the contact object. The contact object may be a contact person or a contact group.

The contact object stored in the contact object list is bound with the identifier of the contact object. Therefore, when the user requests the communication device to present the relationship closeness between the user and the selected contact object, the identifier of the contact object, where the identifier of the contact object is bound to the contact object selected by the user, may be acquired from the contact object list.

Step 202: Acquire, according to the acquired identifier of the contact object, a contact factor of contact between the user and the contact object in a period.

The contact factor includes contact duration or the number of times of contact. Specifically, according to the acquired identifier of the contact object, records including the acquired identifier of the contact object are searched for in stored corresponding relationships between identifiers of contact objects and contact moments, and records with contact moments in a period are selected from the found records. Statistics on the number of the selected records is collected, and the statistic number is used as a contact factor of contact between the user and the contact object in the period, where the statistic number is the number of times of contact. Alternatively, according to the acquired identifier of the contact object, records including the identifier of the contact object are searched for in stored corresponding relationships between identifiers of contact objects, contact moments and contact duration, and records with contact moments in a period is selected from the found records. The contact duration included in the selected records is accumulated, and the accumulated contact duration is used as the contact factor of contact between the user and the contact object in the period.

In this embodiment, the period may be divided into n sub-periods, where n is an integer greater than or equal to 2. Accordingly, records with contact moments separately in the n sub-periods are selected from records that include the acquired identifier of the contact object and are found in the stored corresponding relationships between identifiers of contact objects and contact moments. Statistics on the number of records included in each sub-period is collected, and the number of records included in each sub-period is used as a contact factor of contact between the user and the contact object in each sub-period. Alternatively, records with contact moments separately in the n sub-periods are selected from records found in the stored corresponding relationships between identifiers of contact objects, contact moments and contact duration. Contact duration included in the records of each sub-period is accumulated to obtain contact duration in each sub-period, and the contact duration in each sub-period is used as a contact factor of contact between the user and the contact object in each sub-period.

For example, it is assumed that a period is 30 days, and the 30 days is divided into two sub-periods which are a first sub-period and a second sub-period. The first sub-period is first 20 days of the 30 days, and the second sub-period is last 10 days of the 30 days. According to the identifier of the contact object, records including the identifier of the contact object are searched for in the corresponding relationships between identifiers of contact objects and contact moments, and a record with a contact moment in the first sub-period is selected from the found records. Statistics on the number of records included in the first sub-period is collected, and the statistic number is used as a contact factor of contact between the user and the contact object in the first sub-period. A record with contact moments in the second sub-period is selected from the found records. Statistics on the number of records included in the second sub-period is collected, and the statistic number is used as a contact factor of contact between the user and the contact object in the second sub-period.

In this embodiment, when the user contacts a certain contact object through the communication device, a contact moment of contact between the user and the contact object and an identifier of the contact object may be acquired, and the acquired identifier of the contact object and the contact moment are used as a record, where the record is stored in corresponding relationships between identifiers of contact objects and contact moments. Alternatively, when the user contacts a certain contact object through the communication device, a contact moment of contact between the user and the contact object, an identifier of the contact object and contact duration of the contact may be acquired, and the acquired identifier of the contact object, contact moment and contact duration are used as a record, where the record is stored in corresponding relationships between identifiers of contact objects, contact moments and contact duration.

A contact manner between the user and the contact object may include a manner such as telephone contact, short message contact and/or interaction contact. Accordingly, the corresponding relationship between the identifier of the contact object and the contact moment may include a corresponding relationship between the identifier of the contact object and a telephone contact moment, a corresponding relationship between the identifier of the contact object and a short message contact moment and/or a corresponding relationship between the identifier of the contact object and an interaction contact moment.

In this embodiment, when the user performs telephone contact with a certain contact object through the communication device, a telephone contact moment of the telephone contact between the user and the contact object and an identifier of the contact object may be acquired, and the acquired identifier of the contact object and telephone contact moment are used as a record, where the record is stored in the corresponding relationship between the identifier of the contact object and the telephone contact moment. When the user performs short message contact with a certain contact object through the communication device, a short message contact moment of the short message contact between the user and the contact object and an identifier of the contact object may be acquired, and the acquired identifier of the contact object and short message contact moment are used as a record, where the record is stored in the corresponding relationship between the identifier of the contact object and the short message contact moment. Alternatively, when the user performs interaction contact with a contact object through the communication device, an interaction contact moment of the interaction contact between the user and the contact object and an identifier of the contact object may be acquired, and the acquired identifier of the contact object and interaction contact moment are used as a record, where the record is stored in the corresponding relationships between identifiers of contact objects and interaction contact moments.

The interaction contact manner is a contact manner in which contact objects perform affective interaction with content being a picture and/or an animation-cartoon, where the animation-cartoon include an animation and/or a cartoon. When the user performs interaction contact with a certain contact object through the communication device, the user may directly use the identifier of the contact object and perform interaction contact with the contact object through the communication device, or use an interaction number of the contact object and perform interaction contact with the contact object through the communication device, where an interaction number of each contact object in the communication device is bound to an identifier of each contact object.

Accordingly, the operation of acquiring the identifier of the contact object may be: if the user directly uses an identifier of a contact object and performs interaction contact with the contact object through the communication device, directly acquiring the identifier of the contact object; if the user uses an interaction number of a contact object and performs interaction contact with the contact object through the communication device, acquiring the interaction number of the contact object, and then acquiring an identifier of the contact object, where the identifier of the contact object is bound to the interaction number of the contact object.

Accordingly, this step may include: according to the acquired identifier of the contact object, searching, in the stored corresponding relationships between identifiers of contact objects and telephone contact moments, for records including the acquired identifier of the contact object, selecting records with telephone contact moments in a period from the found records, collecting statistics on the number of the selected records, and using the statistic number as a telephone contact factor of the telephone contact between the user and the contact object in the period;

according to the acquired identifier of the contact object, searching, in the stored corresponding relationships between identifiers of contact objects and short message contact moments, for records including the acquired identifier of the contact object, selecting records with short message contact moments in the period from the found records, collecting statistics on the number of the selected records, and using the statistic number as a short message contact factor of the short message contact between the user and the contact object in the period; and/or according to the acquired identifier of the contact object, searching, in the stored corresponding relationships between identifiers of contact objects and interaction contact moments, for records including the acquired identifier of the contact object, selecting records with interaction contact moments in the period from the found records, collecting statistics on the number of the selected records, and using the statistic number as an interaction contact factor of the interaction contact between the user and the contact object in the period.

If the latest preset time is divided into n sub-periods, accordingly, the step may include:

after searching, in the stored corresponding relationships between identifiers of contact objects and telephone contact moments, for records including the acquired identifier of the contact object, selecting records with telephone contact moments separately in the n sub-periods from the found records, collecting statistics on the number of records included in each sub-period, and using the statistic number of records included in each sub-period as a telephone contact factor of the telephone contact between the user and the contact object in each sub-period;

after searching, in the stored corresponding relationships between identifiers of contact objects and short message contact moments, for records including the acquired identifier of the contact object, selecting records with short message contact moments separately in the n sub-periods from the found records, collecting statistics on the number of records included in each sub-period, and using the statistic number of records included in each sub-period as a short message contact factor of the short message contact between the user and the contact object in each sub-period; and after searching, in the stored corresponding relationships between identifiers of contact objects and interaction contact moments, for records including the acquired identifier of the contact object, selecting records with interaction contact moments separately in the n sub-periods from the found records, collecting statistics on the number of records included in each sub-period, and using the statistic number of records included in each sub-period as an interaction contact factor of the interaction contact between the user and the contact object in each sub-period.

For example, the period of 30 days is divided into a first sub-period and a second sub-period. According to the identifier of the contact object, records including the identifier of the contact object are searched for in the corresponding relationships between identifiers of contact objects and telephone contact moments, and a record with a telephone contact moment in the first sub-period and a record with a telephone contact moment in the second sub-period are separately selected from the found records. Statistics is collected on the number A1 of records included in the first sub-period and the number A2 of records included in the second sub-period. The statistic number A1 is used as a telephone contact factor A1 of the telephone contact between the user and the contact object in the first sub-period, and the statistic number A2 is used as a telephone contact factor A2 of the telephone contact between the user and the contact object in the second sub-period.

According to the identifier of the contact object, records including the identifier of the contact object are searched for in the corresponding relationships between identifiers of contact objects and short message contact moments, and a record with a short message contact moment in the first sub-period and a record with a short message contact moment in the second sub-period are separately selected from the found records. Statistics is collected on the number B1 of records included in the first sub-period and the number B2 of records included in the second sub-period. The statistic number B1 is used as a short message contact factor B1 of the short message contact between the user and the contact object in the first sub-period, and the statistic number B2 is used as a short message contact factor B2 of the short message contact between the user and the contact object in the second sub-period.

According to the identifier of the contact object, records including the identifier of the contact object are searched for in the corresponding relationships between identifiers of contact objects and interaction contact moments, and a record with an interaction contact moment in the first sub-period and a record with an interaction contact moment in the second sub-period are separately selected from the found records. Statistics is collected on the number C1 of records included in the first sub-period and the number C2 of records included in the second sub-period. The statistic number C1 is used as an interaction contact factor C1 of the interaction contact between the user and the contact object in the first sub-period, and the statistic number C2 is used as the number C2 of times of the interaction contact between the user and the contact object in the second sub-period.

Step 203: Calculate a value of closeness between the user and the contact object according to the contact factor of contact between the user and the contact object.

Specifically, the value of closeness between the user and the contact object is calculated according to the contact factor of contact between the user and the contact object and through a formula (1).

$$H = Frequency * weight * time * element \quad (1)$$

In the formula (1), H is the value of closeness, Frequency is the contact factor, weight is a weight, time is latest preset time, and element is a coefficient.

The weight and coefficient element are both fixed values set by a technician in advance.

If the period is divided into n sub-periods, each sub-period is corresponding to a coefficient, and accordingly, this step may be: calculating the value of closeness between the user and the contact object according to a contact factor of contact between the user and the contact object in each sub-period and through a formula (2).

$$H = \sum_{k=1}^{n} Frequency_k * weight * time_k * element_k \quad (2)$$

In the formula (2), H is the value of closeness, k is an integer from 1 to n, Frequency$_k$ is a contact factor in a k$^{th}$ sub-period, time$_k$ is the k$^{th}$ sub-period, and element$_k$ is a coefficient corresponding to the k$^{th}$ sub-period.

n coefficients separately corresponding to the n sub-periods are all fixed values set by technicians in advance, that is, values of coefficients element1 to elementn are all fixed values.

It is assumed that the period is divided into a first sub-period time1 and a second sub-period time2. The coefficient corresponding to the first sub-period time1 is element1, and the coefficient corresponding to the second sub-period time2 is element2. Accordingly, this step may be: calculating the value of closeness between the user and the contact object, according to the number Frequency1 of times of contact in the first sub-period and the number Frequency2 of times of contact in the second sub-period between the user and the contact object, and according to the following formula (2-1).

$$H = Frequency1 * weight * time1 * element1 + Frequency2 * weight * time2 * element2 \quad (2-1)$$

Contact manners include telephone contact, short message contact and interaction contact, where each contact manner is corresponding to one weight. Accordingly, this step may be: calculating the value of closeness between the user and the contact object, according to a telephone contact factor of telephone contact, a short message contact factor of short message contact and an interaction contact factor of interaction contact between the user and the contact object, and through a preset calculation model shown in a formula (3).

$$H = (FrequencyA * weightA + FrequencyB * weightB + FrequencyC * weightC) * time * element \quad (3)$$

In the formula (3), FrequencyA is the telephone contact factor, weightA is a weight corresponding to the telephone contact manner, FrequencyB is the short message contact factor, weightB is a weight corresponding to the short message contact manner, FrequencyC is the interaction contact factor, and weightC is a weight corresponding to the interaction contact manner.

The weights weightA, weightB and weightC and the coefficient element are all fixed values set by a technician in advance.

In this embodiment, if the period is divided into n sub-periods and the above three contact manners are adopted, this step may be: calculating the value of closeness between the user and the contact object, through a formula (4) and according to telephone contact factors, short message contact factors and interaction contact factors in the n sub-periods.

$$H = \sum_{k=1}^{n} (FrequencyA_k * weightA + FrequencyB_k * weightB + FrequencyC_k * weightC) * time_k * element_k \quad (4)$$

In the formula 4, H is the value of closeness, k is an integer from 1 to n, weightA is a weight corresponding to the telephone contact manner, weightB is a weight corresponding to the short message contact manner, weightC is a weight corresponding to the interaction contact manner, FrequencyA$_k$ is a telephone contact factor in a k$^{th}$ Sub-period, FrequencyB$_k$ is a short message contact factor in the $k^{th}$ sub-period, FrequencyCk is an interaction contact factor in the $k^{th}$ sub-period, timek is the $k^{th}$ sub-period, and elementk is a coefficient corresponding to the $k^{th}$ sub-period.

For example, it is assumed that the period is divided into a first sub-period time1 and a second sub-period time2, and this step may be: calculating the value of closeness between the user and the contact object, according to a telephone contact factor FrequencyA1 of telephone contact in the first sub-period time1 and a telephone contact factor FrequencyA2 of telephone contact in the second sub-period time2, a short message contact factor FrequencyB1 of short message contact in the first sub-period time1 and a short message contact factor FrequencyB2 of short message contact in the second sub-period time2, and an interaction contact factor FrequencyC1 of interaction contact in the first sub-period time1 and an interaction contact factor FrequencyC2 of interaction contact in the second sub-period time2 between the user and the contact object, and according to the following formula (4-1).

$$H=FrequencyA1*weightA+FrequencyB1*weightB+\\FrequencyC1*weightC)*time1*element1+\\FrequencyA2*weightA+FrequencyB2*weightB+\\FrequencyC2*weightC)*time2*element2 \quad (4\text{-}1)$$

In this embodiment, n sub-periods are set, and each sub-period is corresponding to a coefficient. A coefficient corresponding to a sub-period closer to current time may be set to a larger value, and the value of closeness calculated in such manner can better reflect closeness between the user and the contact object in recent time.

Step 204: Display the calculated value of closeness as a graphical object.

Figure 3:
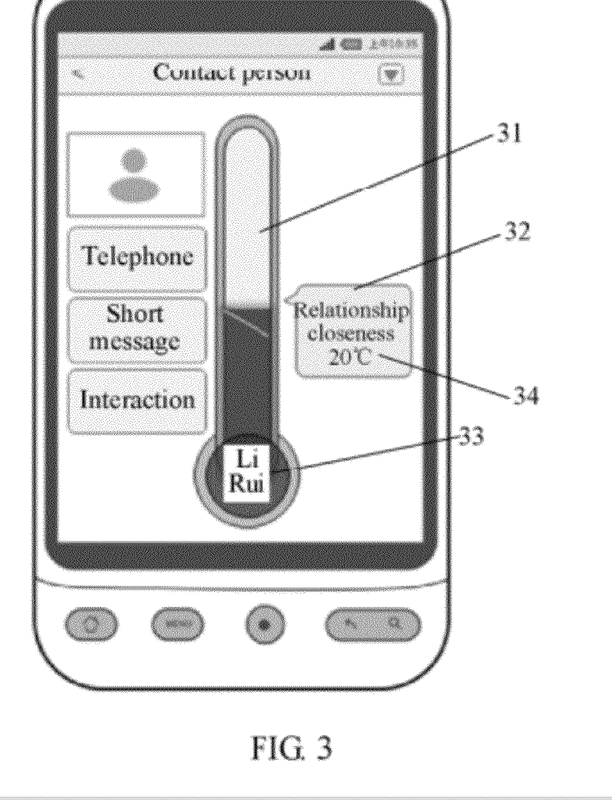
FIG. 3 is a schematic diagram of a display interface according to Embodiment 2 of the present invention.

Referring to FIG. 3, specifically, a first virtual display element 31 is generated, where the first virtual display element 31 is used to indicate a preset range of a value of closeness through a span of the first virtual display element 31 on a screen. A second virtual display element 32 is generated, where the second virtual display element 32 is attached to the first virtual display element 31 for indicating the value of closeness through a position of the second virtual display element 32 relative to the first virtual display element 31.

An operation for generating the first virtual display element 31 may be: generating a bar-shaped first virtual display element 31.

An operation for generating the second virtual display element 32 may be:

generating a vernier-shaped or slidable bar-shaped second virtual display element 32 capable of moving along the first virtual display element 31.

An operation for generating the first virtual display element 31 may be:

generating a hollow bar-shaped first virtual display element 31.

An operation for generating the second virtual display element 32 may be:

generating a vernier-shaped or slidable bar-shaped second virtual display element 32 that is sealed in the hollow bar-shaped first virtual display element 31 and capable of moving along the hollow bar-shaped first virtual display element 31.

The operation for generating the first virtual display element 31 may further include:

giving a visual feature to the first virtual display element 31.

The operation for generating the second virtual display element 32 may further include:

giving the second virtual display element 32 a visual feature different from the visual feature given to the first virtual display element 31.

The visual feature may be a color, a shape or a combination a color and a shape.

Furthermore, buttons corresponding to all contact manners may be displayed. For example, in FIG. 3, buttons corresponding to the telephone contact manner, short message contact manner and interaction contact manner may be displayed. The user may use a corresponding contact manner through the bottom corresponding to each contact manner to contact the contact object.

Furthermore, in this embodiment, the user may further set a special time corresponding to the contact object in the communication device, for example, using the birthday or an anniversary of a certain contact object as the special time corresponding to the contact object. At the special time of the contact object, the communication device may remind the user, for example, reminding the user about sending a blessing short message to the contact user.

In the embodiment of the present invention, the identifier of the contact object selected by the user is acquired. The telephone contact factor of telephone contact, the short message contact factor of short message contact and the interaction contact factor of interaction contact between the user and the contact object in a period are acquired according to the identifier of the contact object selected by the user. The value of closeness between the user and the contact object is calculated according to the acquired telephone contact factor, short message contact factor and interaction contact factor, and the calculated value of closeness is displayed as the graphical object. In this way, the relationship closeness between the user and the contact object can be presented objectively.

Embodiment 3

Figure 4:
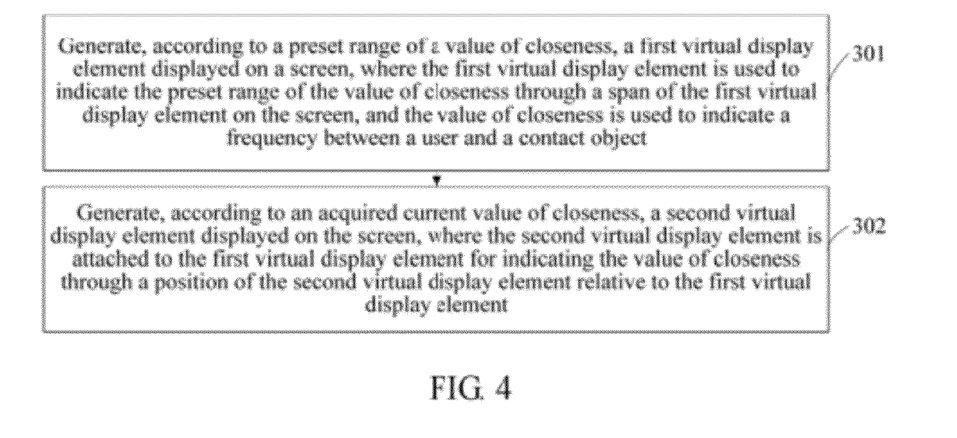
FIG. 4 is a flow chart of a method for presenting relationship closeness according to Embodiment 3 of the present invention.

As shown in FIG. 3 and FIG. 4, an embodiment of the present invention provides a method for presenting relationship closeness, which includes:

Step 301: Generate, according to a preset range of a value of closeness, a first virtual display element displayed on a screen, where the first virtual display element is used to indicate the preset range of the value of closeness through a span of the first virtual display element on the screen, and the value of closeness is used to indicate a frequency between a user and a certain contact object.

Step 302: Generate, according to an acquired current value of closeness, a second virtual display element displayed on the screen, where the second virtual display element is attached to the first virtual display element for indicating the value of closeness through a position of the second virtual display element relative to the first virtual display element.

An operation for generating the first virtual display element displayed on the screen may be: generating a bar-shaped first virtual display element displayed on the screen.

An operation for generating the second virtual display element displayed on the screen may be: generating a vernier-shaped or slidable bar-shaped second virtual display element that is displayed on the screen and capable of moving along the first virtual display element.

An operation for generating the first virtual display element displayed on the screen may be: generating a hollow bar-shaped first virtual display element displayed on the screen.

An operation for generating the second virtual display element displayed on the screen may be: generating a vernier-shaped or slidable bar-shaped second virtual display element that is displayed on the screen, sealed in the hollow bar-shaped first virtual display element and capable of moving along the hollow bar-shaped first virtual display element.

The operation for generating the first virtual display element displayed on the screen may further include: giving a visual feature to the first virtual display element.

The operation for generating the second virtual display element displayed on the screen may further include: giving the second virtual display element a visual feature different from the visual feature given to the first virtual display element.

The visual feature may be a color, a shape or a combination a color and a shape.

Furthermore, the method may further include generating a character value of closeness associated with the second virtual display element.

Furthermore, the method may further include generating a graphical or character contact object identifier 33 associated with the first virtual display element.

A value of closeness factor identifier 34 of a factor affecting the value of closeness of the contact object is generated.

Embodiment 4

Figure 5:
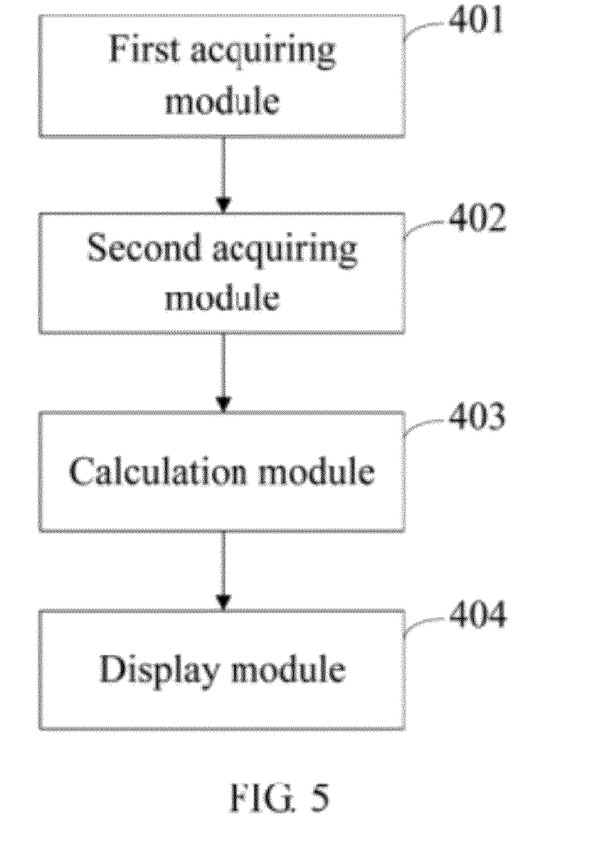
FIG. 5 is a schematic diagram of a device for presenting relationship closeness according to Embodiment 4 of the present invention.

As shown in FIG. 5, an embodiment of the present invention provides a device for acquiring relationship closeness, which includes:

a first acquiring module 401, configured to acquire an identifier of a contact object selected by a user;

a second acquiring module 402, configured to acquire, according to the identifier of the contact object, at least one contact factor of contact between the user and the contact object in a period, where the contact factor includes contact duration or the number of times of contact;

a calculation module 403, configured to calculate a value of closeness between the user and the contact object according to the acquired contact factor, where the value of closeness is used to indicate closeness between the user and the contact object; and a display module 404, configured to display the calculated value of closeness as a graphical object.

The second acquiring module 402 includes:

a first searching unit, configured to, according to the identifier of the contact object, search, in stored corresponding relationships between identifiers of contact objects and contact moments, for records including the identifier of the contact object; and a first statistics unit, configured to select records with contact moments in a period from the found records, collect statistics on the number of the selected records, and use the statistic number as the contact factor of contact between the user and the contact object in the period.

Moreover, the device further includes:

a first storage module, configured to acquire a contact moment of contact between the user and the contact object when the user contacts the contact object, and store a corresponding relationship between the identifier of the contact object and the contact moment.

The second acquiring module 402 includes:

a second searching unit, configured to, according to the identifier of the contact object, search, in stored corresponding relationships between identifiers of contact objects, contact moments and contact duration, for records including the identifier of the contact object; and an accumulation unit, configured to select records with contact moments in a period from the found records, accumulate contact duration included in the selected records, and use the accumulated contact duration as a contact factor of contact between the user and the contact object in a period.

Moreover, the device may further include:

a second storage module, configured to acquire a contact moment and contact duration of contact between the user and the contact object when the user contacts the contact object, and store a corresponding relationship between the acquired identifier of the contact object, contact moment and contact duration.

Contact manners between the user and the contact object include a telephone contact manner, a short message contact manner and an interaction contact manner.

Accordingly, the second acquiring module 402 includes:

a third searching unit, configured to, according to the identifier of the contact object, search, in stored corresponding relationships between identifiers of contact objects and telephone contact moments, for records including the identifier of the contact object;

a second statistics unit, configured to select records with telephone contact moments in a period from the found records, collect statistics on the number of the selected records, and use the statistic number as a telephone contact factor of telephone contact between the user and the contact object in the period;

a fourth searching unit, configured to, according to the identifier of the contact object, search, in stored corresponding relationships between identifiers of contact objects and short message contact moments, for records including the identifier of the contact object;

a third statistics unit, configured to select records with short message contact moments in the period from the found records, collect statistics on the number of the selected records, and use the statistic number as a short message contact factor of short message contact between the user and the contact object in the period;

a fifth searching unit, configured to, according to the identifier of the contact object, search, in stored corresponding relationships between identifiers of contact objects and interaction contact moments, for records including the identifier of the contact object; and a fourth statistics unit, configured to select records with interaction contact moments in the period from the found records, collect statistics on the number of the selected records, and use the statistic number as an interaction contact factor of interaction contact between the user and the contact object in the period.

Moreover, the device further includes:

a third storage module, configured to, when the user performs telephone contact with the contact object, acquire a telephone contact moment of telephone contact between the user and the contact object, and store a corresponding relationship between the identifier of the contact object and the telephone contact moment;

a fourth storage module, configured to, when the user performs short message contact with the contact object, acquire a short message contact moment of short message contact between the user and the contact object, and store a corresponding relationship between the identifier of the contact object and the short message contact moment; and a fifth storage module, configured to, when the user performs interaction contact with the contact object, acquire an interaction contact moment of interaction contact between the user and the contact object, and store a corresponding relationship between the identifier of the contact object and the interaction contact moment.

Furthermore, the calculation module 403 is configured to calculate the value of closeness between the user and the contact object according to the contact factor and through a formula (1).

$$H = Frequency * weight * time * element \quad (1);$$

In the formula (1), H is the value of closeness, Frequency is the contact factor, time is latest preset time, and element is a coefficient.

The period includes n sub-periods, where n is an integer greater than or equal to 2.

Accordingly, the calculation module 403 is configured to calculate the value of closeness between the user and the contact object, through a formula (2) and according to the contact factors of contact between the user and the contact object separately in the n sub-periods.

$$H = \sum_{k=1}^{n} Frequency k * weight * time k * element k \quad (2)$$

In the formula (2), H is the value of closeness, k is an integer from 1 to n, Frequencyk is a contact factor in a $k^{th}$ sub-period, timek is the $k^{th}$ sub-period, and elementk is a coefficient corresponding to the $k^{th}$ sub-period.

The calculation module 403 is configured to calculate the value of closeness between the user and the contact object, through a formula (3) and according to the telephone contact factor, short message contact factor and interaction contact factor.

$$H = (FrequencyA * weightA + FrequencyB * weightB + FrequencyC * weightC) * time * element \quad (3);$$

In the formula (3), H is the value of closeness, FrequencyA is the telephone contact factor, weightA is a weight corresponding to the telephone contact manner, FrequencyB is the short message contact factor, weightB is a weight corresponding to the short message contact manner, FrequencyC is the interaction contact factor, weightC is a weight corresponding to the interaction contact manner, time is the latest preset time, and element is a coefficient.

The latest preset time includes n sub-periods, where n is an integer greater than or equal to 2.

Accordingly, the calculation module 403 is configured to calculate the value of closeness between the user and the contact object, through a formula (4) and according to the telephone contact factors, short message contact factors and interaction contact factors in the n sub-periods.

$$H = \sum_{k=1}^{n} (FrequencyAk * weightA + FrequencyBk * weightB + FrequencyCk * weightC) * timek * element k \quad (4)$$

In the formula 4, H is the value of closeness, k is an integer from 1 to n, weightA is a weight corresponding to the telephone contact manner, weightB is a weight corresponding to the short message contact manner, weightC is a weight corresponding to the interaction contact manner, FrequencyAk is a telephone contact factor in a $k^{th}$ sub-period, FrequencyBk is a short message contact factor in the $k^{th}$ sub-period, FrequencyCk is an interaction contact factor in the $k^{th}$ sub-period, timek is the $k^{th}$ sub-period, and elementk is a coefficient corresponding to the $k^{th}$ sub-period.

The display module 404 includes:

a first generation unit, configured to generate a first virtual display element, where the first virtual display element is used to indicate a preset range of a value of closeness through a span of the first virtual display element on a screen; and a second generation unit, configured to generate a second virtual display element, where the second virtual display element is attached to the first virtual display element for indicating the value of closeness through a position of the second virtual display element relative to the first virtual display element.

The first generation unit is configured to generate a bar-shaped first virtual display element.

The second generation unit is configured to generate a vernier-shaped or slidable bar-shaped second virtual display element capable of moving along the first virtual display element.

The first generation unit is configured to generate a hollow bar-shaped first virtual display element.

The second generation unit is configured to generate a vernier-shaped or slidable bar-shaped second virtual display element that is sealed in the hollow bar-shaped first virtual display element and capable of moving along the hollow bar-shaped first virtual display element.

The first generation unit is further configured to give a visual feature to the first virtual display element.

The second generation unit is further configured to give the second virtual display element a visual feature different from the visual feature given to the first virtual display element.

The visual feature may be a color, a shape or a combination of a color and a shape.

In the embodiment of the present invention, the identifier of the contact object selected by the user is acquired. The telephone contact factor of telephone contact, the short message contact factor of short message contact and the interaction contact factor of interaction contact between the user and the contact object in a period are acquired according to the identifier of the contact object selected by the user. The value of closeness between the user and the contact object is calculated according to the acquired telephone contact factor, short message contact factor and interaction contact factor, and the calculated value of closeness is displayed as the graphical object. In this way, the relationship closeness between the user and the contact object is presented objectively.

Embodiment 5

Figure 6:
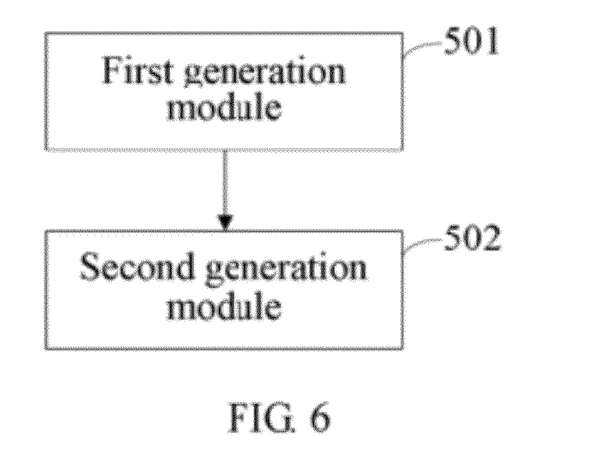
FIG. 6 is a schematic diagram of a device for presenting relationship closeness according to Embodiment 5 of the present invention.

As shown in FIG. 6, an embodiment of the present invention provides a device for presenting relationship closeness, which includes:

a first generation module 501, configured to generate, according to a preset range of a value of closeness, a first virtual display element displayed on a screen, where the first virtual display element is used to indicate the preset range of the value of closeness through a span of the first virtual display element on the screen, and the value of closeness is used to indicate a frequency between a user and a contact object or a contact group; and a second generation module 502, configured to generate a second virtual display element displayed on the screen according to an acquired current value of closeness, where the second virtual display element is attached to the first virtual display element for indicating the value of closeness through a position of the second virtual display element relative to the first virtual display element.

The first generation module 501 is configured to generate a bar-shaped first virtual display element displayed on the screen.

The second generation unit 502 is configured to generate a vernier-shaped or slidable bar-shaped second virtual display element that is displayed on the screen and capable of moving along the first virtual display element.

The first generation module 501 is configured to generate a hollow bar-shaped first virtual display element displayed on the screen.

The second generation module 502 is configured to generate a vernier-shaped or slidable bar-shaped second virtual display element that is displayed on the screen, sealed in the hollow bar-shaped first virtual display element and capable of moving along the hollow bar-shaped first virtual display element.

Furthermore, the first generation module 501 may be further configured to give a visual feature to the first virtual display element.

The second generation module 502 may be further configured to give the second virtual display element a visual feature different from the visual feature given to the first virtual display element.

The visual feature may be a color, a shape or a combination of a color and a shape.

Furthermore, the device may further include:

a third generation module, configured to generate a character value of closeness associated with the second virtual display element.

Furthermore, the device may further include:

a fourth generation module, configured to generate a graphical or character contact object identifier associated with the first virtual display element.

Furthermore, the device may further include:

a fifth generation module, configured to generate a value of closeness factor identifier of a factor affecting the value of closeness of the contact object.

Persons of ordinary skill in the art should understand that, all of or part of steps in the embodiments may be completed by hardware, or may be completed by a program instructing relevant hardware. The program may be stored in a computer readable storage medium. The foregoing storage medium may be a read-only memory, a magnetic disk, or an optical disk.

The above embodiments are merely exemplary embodiments of the present invention, and are not intended to limit the present invention. Any modifications, equivalent replacements or improvements without departing from the spirit and principle of the present invention shall fall within the protection scope of the present invention.

What is claimed is:

1. A method for acquiring relationship closeness, comprising:

acquiring, by a processor, an identifier of a contact object selected by a user;

acquiring, by the processor, according to the identifier of the contact object, at least one contact factor of a contact between the user and the contact object in a period, wherein the contact factor comprises contact duration or the number of times of contact;

calculating, by the processor, a value of closeness between the user and the contact object according to the contact factor, wherein the value of closeness indicates closeness between the user and the contact object; and displaying, on a screen, the value of closeness as a graphical object, wherein the period comprises n sub-periods, and n is an integer greater than or equal to 2;

wherein the calculating, by the processor, the value of closeness between the user and the contact object according to the contact factor comprises:

calculating, by the processor, the value of closeness between the user and the contact object, through a formula (2) and according to contact factors of the contact between the user and the contact object separately in the n sub-periods;

$$H = \sum_{k=1}^{n} Frequencyk * \text{weight} * timek * elementk \qquad (2)$$

wherein in the formula (2), H is the value of closeness, k is an integer from 1 to n, Frequencyk is a contact factor in a $k^{th}$ sub-period, timek is the $k^{th}$ sub-period, elementk is a coefficient corresponding to the $k^{th}$ sub-period, and weight is a weight.

2. The method according to claim 1, wherein the acquiring, by the processor, according to the identifier of the contact object, the at least one contact factor of a contact between the user and the contact object in a period comprises:

according to the identifier of the contact object, searching, by the processor, in stored corresponding relationships between identifiers of contact objects and contact moments, for records comprising the identifier of the contact object; and selecting, by the processor, records with contact moments in a period from the found records, collecting, by a processor, statistics on the number of the selected records, and using the number as the contact factor of the contact between the user and the contact object in the period.

3. The method according to claim 1, wherein before the acquiring, by the processor, the at least one contact factor of a contact between the user and the contact object in a period, the method further comprises:

acquiring, by the processor, a contact moment of the contact between the user and the contact object when the user contacts the contact object, and storing, in a memory, a corresponding relationship between the identifier of the contact object and the contact moment.

4. The method according to claim 1, wherein the acquiring, by the processor, according to the identifier of the contact object, the at least one contact factor between the user and the contact object in a period comprises:

according to the identifier of the contact object, searching, by the processor, in stored corresponding relationships between identifiers of contact objects, contact moments and contact duration, for records comprising the identifier of the contact object; and selecting, by the processor, records with contact moments in a period from the found records, accumulating, by the processor, contact duration comprised in the selected records, and using the accumulated contact duration as the contact factor of the contact between the user and the contact object in the period.

5. The method according to claim 1, wherein before the acquiring, by the processor, the at least one contact factor of a contact between the user and the contact object in a period, the method further comprises:

acquiring, by the processor, a contact moment and contact duration of the contact between the user and the contact object when the user contacts the contact object, and storing, in the memory, a corresponding relationship between the identifier of the contact object, the contact moment and the contact duration.

6. The method according to claim 1, wherein contact manners between the user and the contact object comprise a telephone contact manner, a short message contact manner and an interaction contact manner;

the acquiring, by the processor, according to the identifier of the contact object, the at least one contact factor of a contact between the user and the contact object in a period comprises:

according to the identifier of the contact object, searching, by the processor, in stored corresponding relationships between identifiers of contact objects and telephone contact moments, for records comprising the identifier of the contact object; and selecting by the processor, records with telephone contact moments in a period from the found records, collecting, by the processor, statistics on the number of the selected records, and using the number as a telephone contact factor of a telephone contact between the user and the contact object in the period;

according to the identifier of the contact object, searching, by the processor, in stored corresponding relationships between identifiers of contact objects and short message contact moments, for records comprising the identifier of the contact object;

selecting, by the processor, records with short message contact moments in the period from the found records, collecting, by the processor, statistics on the number of the selected records, and using the number as a short message contact factor of short message contact between the user and the contact object in the period;

according to the identifier of the contact object, searching, by the processor, in stored corresponding relationships between identifiers of contact objects and interaction contact moments, for records comprising the identifier of the contact object; and selecting, by the processor, records with interaction contact moments in the period from the found records, collecting, by the processor, statistics on the number of the selected records, and using the number as an interaction contact factor of an interaction contact between the user and the contact object in the period.

7. The method according to claim 6, wherein before acquiring, by the processor, the at least one contact factor of a contact between the user and the contact object in a period, the method further comprises:

when the user performs a telephone contact with the contact object, acquiring, by the processor, a telephone contact moment of the telephone contact between the user and the contact object, and storing, in the memory, a corresponding relationship between the identifier of the contact object and the telephone contact moment;

when the user performs a short message contact with the contact object, acquiring, by the processor, a short message contact moment of the short message contact between the user and the contact object, and storing, in the memory, a corresponding relationship between the identifier of the contact object and the short message contact moment; and when the user performs an interaction contact with the contact object, acquiring, by the processor, an interaction contact moment of the interaction contact between the user and the contact object, and storing, in the memory, a corresponding relationship between the identifier of the contact object and the interaction contact moment.

8. The method according to claim 1, wherein the calculating, by the processor, the value of closeness between the user and the contact object according to the contact factor comprises:

calculating, by the processor, the value of closeness between the user and the contact object according to the contact factor and through a formula (1):

$$H = Frequency * weight * time * element \quad (1);$$

wherein in the formula (1), H is the value of closeness, Frequency is the contact factor, time is the period, element is a coefficient, and weight is a weight.

9. The method according to claim 6, wherein the calculating, by the processor, the value of closeness between the user and the contact object according to the contact factor comprises:

calculating, by the processor, the value of closeness between the user and the contact object through a formula (3) and according to the telephone contact factor, short message contact factor and interaction contact factor;

$$H = (FrequencyA * weightA + FrequencyB * weightB + FrequencyC * weightC) * time * element \quad (3);$$

wherein in the formula (3), H is the value of closeness, FrequencyA is the telephone contact factor, weightA is a weight corresponding to the telephone contact manner, FrequencyB is the short message contact factor, weightB is a weight corresponding to the short message contact manner, FrequencyC is the interaction contact factor, weightC is a weight corresponding to the interaction contact manner, time is the period, and element is a coefficient.

10. The method according to claim 6, wherein the period comprises n sub-periods, and n is an integer greater than or equal to 2;

the calculating, by the processor, the value of closeness between the user and the contact object according to the contact factor comprises:

calculating, by the processor, the value of closeness between the user and the contact object, through a formula (4) and according to telephone contact factors, short message contact factors and interaction contact factors in the n sub-periods;

$$H = \sum_{k=1}^{n} (FrequencyAk * weightA + FrequencyBk * weightB + FrequencyCk * weightC) * timek * elementk \quad (4)$$

wherein in the formula 4, H is the value of closeness, k is an integer from 1 to n, weightA is a weight corresponding to the telephone contact manner, weightB is a weight corresponding to the short message contact manner, weightC is a weight corresponding to the interaction contact manner, FrequencyAk is a telephone contact factor in a $k^{th}$ sub-period, FrequencyBk is a short message contact factor in the $k^{th}$ sub-period, FrequencyCk is an interaction contact factor in the $k^{th}$ sub-period, timek is the $k^{th}$ sub-period, and elementk is a coefficient corresponding to the $k^{th}$ sub-period.

11. The method according to claim 1, wherein the displaying, on a screen, the value of closeness as the graphical object comprises:
generating a first virtual display element, wherein the first virtual display element is used to indicate a preset range of the value of closeness through a span of the first virtual display element on a screen; and
generating a second virtual display element, wherein the second virtual display element is attached to the first virtual display element for indicating the value of closeness through a position of the second virtual display element relative to the first virtual display element.

12. The method according to claim 11, wherein the generating the first virtual display element comprises:
generating a bar-shaped first virtual display element; and the generating the second virtual display element comprises:
generating a vernier-shaped or slidable bar-shaped second virtual display element capable of moving along the first virtual display element.

13. The method according to claim 11, wherein the generating the first virtual display element comprises:
generating a hollow bar-shaped first virtual display element; and
the generating the second virtual display element comprises:
generating a vernier-shaped or slidable bar-shaped second virtual display element that is sealed in the hollow bar-shaped first virtual display element and capable of moving along the hollow bar-shaped first virtual display element.

14. The method according to claim 11, wherein the generating the first virtual display element further comprises:
giving a visual feature to the first virtual display element; and
the generating the second virtual display element further comprises:
giving the second virtual display element a visual feature different from the visual feature given to the first virtual display element.

15. A method for presenting relationship closeness, comprising:
generating, according to a preset range of a value of closeness, a first virtual display element displayed on a screen, wherein the first virtual display element is used to indicate the preset range of the value of closeness through a span of the first virtual display element on the screen, and the value of closeness is used to indicate a frequency between a user and a contact object; and
generating, according to an acquired current value of closeness, a second virtual display element displayed on the screen, wherein the second virtual display element is attached to the first virtual display element for indicating the value of closeness through a position of the second virtual display element relative to the first virtual display element,
wherein the acquired current value of closeness is calculated through:
acquiring, by a processor, an identifier of a contact object selected by a user;
acquiring, by the processor, according to the identifier of the contact object, at least one contact factor of a contact between the user and the contact object in a period, wherein the contact factor comprises contact duration or the number of times of contact, and the period comprises n sub-periods, and n is an integer greater than or equal to 2;
calculating, by the processor, the current value of closeness between the user and the contact object, through a formula (2) and according to contact factors of the contact between the user and the contact object separately in the n sub-periods;

$$H = \sum_{k=1}^{n} Frequency_k * weight * time_k * element_k \qquad (2)$$

wherein in the formula (2), H is the value of closeness, k is an integer from 1 to n, Frequency$_k$ is a contact factor in a $k^{th}$ sub-period, time$_k$ is the $k^{th}$ sub-period, element$_k$ is a coefficient corresponding to the $k^{th}$ sub-period, and weight is a weight.

16. The method according to claim 15, wherein the generating the first virtual display element displayed on the screen comprises:
generating a bar-shaped first virtual display element displayed on the screen; and
accordingly, the generating the second virtual display element displayed on the screen comprises:
generating a vernier-shaped or slidable bar-shaped second virtual display element that is displayed on the screen and capable of moving along the first virtual display element.

17. The method according to claim 15, wherein the generating the first virtual display element displayed on the screen comprises:
generating a hollow bar-shaped first virtual display element displayed on the screen; and
accordingly, the generating the second virtual display element displayed on the screen comprises:
generating a vernier-shaped or slidable bar-shaped second virtual display element that is displayed on the screen, sealed in the hollow bar-shaped first virtual display element and capable of moving along the hollow bar-shaped first virtual display element.

18. The method according to claim 15, wherein the generating the first virtual display element displayed on the screen further comprises:
giving a visual feature to the first virtual display element; and
accordingly, the generating the second virtual display element displayed on the screen further comprises:
giving the second virtual display element a visual feature different from the visual feature given to the first virtual display element.

19. A device for acquiring relationship closeness, comprising:
a first acquiring module, configured to acquire an identifier of a contact object selected by a user;
a second acquiring module, configured to acquire, according to the identifier of the contact object, at least one contact factor of a contact between the user and the contact object within a period, wherein the contact factor comprises contact duration or the number of times of contact;
a calculation module, configured to calculate a value of closeness between the user and the contact object according to the contact factor, wherein the value of closeness is used to indicate closeness between the user and the contact object; and
a display module, configured to display the value of closeness as a graphical object, wherein the period comprises n sub-periods, and n is an integer greater than or equal to 2;

wherein the calculation module is configured to calculate the value of closeness between the user and the contact object, through a formula (2) and according to the contact factors of the contact between the user and the contact object separately in the n sub-periods, $$H = \sum_{k=1}^{n} Frequency k * \text{weight} * timek * elementk \quad (2)$$

where, H is the value of closeness, k is an integer from 1 to n, Frequencyk is a contact factor in a $k^{th}$ sub-period, timek is the $k^{th}$ sub-period, and elementk is a coefficient corresponding to the $k^{th}$ sub-period, and weight is a weight.

20. The device according to claim 19, wherein the second acquiring module comprises:
- a first searching unit, configured to, according to the identifier of the contact object, search, in stored corresponding relationships between identifiers of contact objects and contact moments, for records comprising the identifier of the contact object; and
- a first statistics unit, configured to select records with contact moments in a period from the found records, collecting statistics on the number of the selected records, and using the number as the contact factor of the contact between the user and the contact object in the period.

21. A device for presenting relationship closeness, comprising:
- a first generation module, configured to generate, according to a preset range of a value of closeness, a first virtual display element displayed on a screen, wherein the first virtual display element is used to indicate the preset range of the value of closeness through a span of the first virtual display element on the screen, and the value of closeness is used to indicate a frequency between a user and a contact object or a contact group; and
- a second generating module, configured to generate, according to an acquired current value of closeness, a second virtual display element displayed on the screen, wherein the second virtual display element is attached to the first virtual display element for indicating the value of closeness through a position of the second virtual display element relative to the first virtual display element;

wherein the acquired current value of closeness is calculated through a device according to claim 19.

22. The device according to claim 21, wherein
the first generation module is configured to generate a bar-shaped first virtual display element displayed on the screen; and
the second generation module is configured to generate a vernier-shaped or slidable bar-shaped second virtual display element that is displayed on the screen and capable of moving along the first virtual display element.

\* \* \* \* \*